United States Patent
Araújo et al.

(10) Patent No.: US 11,256,251 B2
(45) Date of Patent: Feb. 22, 2022

(54) ENABLING REMOTE CONTROL OF A VEHICLE

(71) Applicant: Telefonaktiebolaget LM Ericsson (publ), Stockholm (SE)

(72) Inventors: José Araújo, Stockholm (SE); Lars Andersson, Solna (SE); Soma Tayamon, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 214 days.

(21) Appl. No.: 16/477,277

(22) PCT Filed: Feb. 6, 2017

(86) PCT No.: PCT/EP2017/052552
§ 371 (c)(1),
(2) Date: Jul. 11, 2019

(87) PCT Pub. No.: WO2018/141415
PCT Pub. Date: Aug. 9, 2018

(65) Prior Publication Data
US 2020/0033853 A1 Jan. 30, 2020

(51) Int. Cl.
*G05D 1/00* (2006.01)
*G05D 1/02* (2020.01)
*G07C 5/00* (2006.01)

(52) U.S. Cl.
CPC ......... *G05D 1/0038* (2013.01); *G05D 1/0061* (2013.01); *G05D 1/0212* (2013.01); *G05D 1/0231* (2013.01); *G07C 5/008* (2013.01); *G05D 2201/0213* (2013.01)

(58) Field of Classification Search
CPC .. G05D 1/0038; G05D 1/0061; G05D 1/0212; G05D 1/0231; G05D 2201/0213; G07C 5/008
See application file for complete search history.

(56) References Cited

U.S. PATENT DOCUMENTS

| | | |
|---|---|---|
| 8,340,902 B1 | 12/2012 | Chiang |
| 9,465,388 B1 | 10/2016 | Fairfield et al. |
| 9,494,439 B1 | 11/2016 | Ross et al. |

(Continued)

OTHER PUBLICATIONS

Communication pursuant to Article 94(3) EPC for European Patent Application No. 17703422.0 dated Jun. 10, 2020.

(Continued)

*Primary Examiner* — Rami Khatib
*Assistant Examiner* — Shahira Baajour
(74) *Attorney, Agent, or Firm* — Sage Patent Group (57) ABSTRACT

It is provided a method for enabling remote control of a vehicle with autonomous propulsion capability. The method is performed by a vehicle data provider and comprises: detecting a need for manual assistance of the vehicle by an operator being remote from the vehicle; obtaining a stream of vehicle data, the vehicle data relating to a time prior to when remote control starts; modifying the vehicle data, which comprises adjusting a duration of playback of the vehicle data; providing the modified vehicle data for playback to the operator; providing, once the playback of modified vehicle data has ended, vehicle data in real-time to the operator; and enabling remote control of the vehicle by the operator.

15 Claims, 4 Drawing Sheets

(56) References Cited

U.S. PATENT DOCUMENTS

| | | | |
|---|---|---|---|
| 2006/0089765 A1* | 4/2006 | Pack | G06N 3/008 |
| | | | 701/23 |
| 2010/0010673 A1 | 1/2010 | Wang et al. | |
| 2015/0105934 A1 | 4/2015 | Palmer et al. | |
| 2015/0248131 A1 | 9/2015 | Fairfield et al. | |
| 2018/0113456 A1* | 4/2018 | Iagnemma | G08G 1/0133 |
| 2018/0284759 A1* | 10/2018 | Michalakis | B60W 30/16 |

OTHER PUBLICATIONS

International Search Report and Written Opinion of the International Searching Authority for International Application No. PCT/EP2017/052552 dated Oct. 27, 2017.

* cited by examiner

ENABLING REMOTE CONTROL OF A VEHICLE

CROSS REFERENCE TO RELATED APPLICATION

This application is a 35 U.S.C. § 371 national stage application of PCT International Application No. PCT/EP2017/052552, filed on Feb. 6, 2017, the disclosure of which is hereby incorporated herein by reference in its entirety.

TECHNICAL FIELD

The present disclosure relates to a method, vehicle data providers, a computer program and a computer program product for enabling remote control of a vehicle with autonomous propulsion capability.

BACKGROUND

There is a great deal of research and development currently in the field of vehicles with autonomous propulsion capability. Applications range from passenger transport such as bus and taxi services, but also goods transports performed by heavy-duty vehicles. In recent years, many companies have validated their autonomous heavy-duty vehicles in real roads. The Google driverless car has been operating in several areas in the United States since 2012. In 2014, Google reported that their cars have completed a total of 1.1 million km in autonomous mode in California. Furthermore, aerial vehicles, such as drones, can be autonomous vehicles.

One issue with autonomous vehicles is that even though they can perform many tasks autonomously, occasionally they need manual assistance to perform certain tasks. For instance, it may happen that a road construction has started in an area where the vehicle was not expecting it to or that the weather conditions have become too severe in such an area, and to drive through that area, a manual assistance using remote control is required. After the task is completed, the vehicle can resume its autonomous operation. Also, a vehicle may request assistance to understand a certain situation and get a confirmation from an operator whether its intended action is correct or safe to proceed with. In this way, the vehicle can learn and improve its autonomous operation.

The request and processing of the manual assistance over remote control should be performed efficiently to save time, increase the assistance effectiveness, safety of operation and reduce operation costs.

US 2015/0248131 A1 presents systems and methods for enabling an autonomous vehicle to request assistance from a remote operator in certain predetermined situations. One example method includes determining a representation of an environment of an autonomous vehicle based on sensor data of the environment. Based on the representation, the method may also include identifying a situation from a predetermined set of situations for which the autonomous vehicle will request remote assistance. The method may further include sending a request for assistance to a remote assistor, the request including the representation of the environment and the identified situation. The method may additionally include receiving a response from the remote assistor indicating an autonomous operation. The method may also include causing the autonomous vehicle to perform the autonomous operation.

However, when the remote operator is to initiate remote control of the vehicle, it is of great importance that the operator is prepared physically and psychologically to be in the environment of the vehicle.

SUMMARY

It is an object to improve how an operator is prepared before assuming remote control of a vehicle.

According to a first aspect, it is provided a method for enabling remote control of a vehicle with autonomous propulsion capability. The method is performed by a vehicle data provider and comprises: detecting a need for manual assistance of the vehicle by an operator being remote from the vehicle; obtaining a stream of vehicle data, the vehicle data relating to a time prior to when remote control starts; modifying the vehicle data, which comprises adjusting a duration of playback of the vehicle data; providing the modified vehicle data for playback to the operator; providing, once the playback of modified vehicle data has ended, vehicle data in real-time to the operator; and enabling remote control of the vehicle by the operator.

The vehicle data may comprise a video stream captured by a camera of the vehicle, The vehicle data provider may form part of the vehicle, in which case the detecting the need for manual assistance comprises receiving an estimated takeover position where the need for remote control the vehicle is expected. The method then further comprises: adapting operation of the vehicle such that the vehicle is expected to arrive at the takeover position based on the time when the playing back of the modified vehicle data has ended.

The adapting operation may comprise adapting operation speed of the vehicle when this is possible and still expect the vehicle to arrive at the takeover position based on the time when the playing back of the modified vehicle data has ended.

The detecting the need for manual assistance may be based on detecting a traffic exception in a navigation route of the vehicle, in which case the takeover position is based on a position of the traffic exception.

The modifying the vehicle data may comprise setting a start time of the vehicle data based on the takeover position.

The method may further comprise: obtaining an indication of an availability time when the operator is available; in which case the adapting operation of the vehicle also considers the indication of the availability time.

The adapting operation of the vehicle may be based on a state of the operator.

The vehicle data may further comprise any one or more of an audio stream, haptic data stream, vehicle speed, vehicle position, vehicle conditions, road conditions, traffic conditions, road accidents, and construction zones.

The modifying the vehicle data may comprise increasing the playback speed for at least part of the vehicle data.

The modifying the vehicle data may comprise leaving the playback speed at normal speed for a section which is considered of more importance for the operator.

The modifying the vehicle data may comprise removing vehicle data of a certain time period which is considered of less importance for the operator.

The modifying the vehicle data may be based on a state of the operator.

According to a second aspect, it is provided a vehicle data provider for enabling remote control of a vehicle with autonomous propulsion capability. The vehicle data provider comprises: a processor; and a memory storing instructions that, when executed by the processor, cause the vehicle data provider to: detect a need for manual assistance of the vehicle by an operator being remote from the vehicle; obtain a stream of vehicle data, the vehicle data relating to a time prior to when remote control starts; modify the vehicle data, which comprises adjusting a duration of playback of the vehicle data; provide the modified vehicle data for playback to the operator; provide, once the playback of modified vehicle data has ended, vehicle data in real-time to the operator; and enable remote control of the vehicle by the operator.

The vehicle data may comprise a video stream captured by a camera of the vehicle, The vehicle data provider may form part of the vehicle, in which case the instructions to detect the need for manual assistance comprise instructions that, when executed by the processor, cause the vehicle data provider to receive an estimated takeover position where the need for remote control the vehicle is expected. Also, the vehicle data provider then further comprises instructions that, when executed by the processor, cause the vehicle data provider to: adapt operation of the vehicle such that the vehicle is expected to arrive at the takeover position based on the time when the playing back of the modified vehicle data has ended.

The instructions to adapt operation may comprise instructions that, when executed by the processor, cause the vehicle data provider to adapt operation speed of the vehicle when this is possible and still expect the vehicle to arrive at the takeover position based on the time when the playing back of the modified vehicle data has ended.

The instructions to detect the need for manual assistance may be based on detecting a traffic exception in a navigation route of the vehicle, in which case the takeover position is based on a position of the traffic exception.

The instructions to modify the vehicle data may comprise instructions that, when executed by the processor, cause the vehicle data provider to set a start time of the vehicle data based on the takeover position.

The vehicle data provider may further comprise instructions that, when executed by the processor, cause the vehicle data provider to: obtain an indication of an availability time when the operator is available. The instructions to adapt operation of the vehicle then comprise instructions that, when executed by the processor, cause the vehicle data provider to also consider the indication of the availability time.

The instructions to adapt operation of the vehicle may comprise instructions that, when executed by the processor, cause the vehicle data provider to adapt operation of the vehicle based on a state of the operator.

The vehicle data may further comprise any one or more of an audio stream, haptic data stream, vehicle speed, vehicle position, vehicle conditions, road conditions, traffic conditions, road accidents, and construction zones.

The instructions to modify the vehicle data may comprise instructions that, when executed by the processor, cause the vehicle data provider to increase the playback speed for at least part of the vehicle data.

The instructions to modify the vehicle data may comprise instructions that, when executed by the processor, cause the vehicle data provider to leave the playback speed at normal speed for a section which is considered of more importance for the operator.

The instructions to modify the vehicle data may comprise instructions that, when executed by the processor, cause the vehicle data provider to remove vehicle data of a certain time period which is considered of less importance for the operator.

The instructions to modify the vehicle data may comprise instructions that, when executed by the processor, cause the vehicle data provider to modify the vehicle data based on a state of the operator.

According to a third aspect, it is provided a vehicle data provider comprising: a detector module configured to detect a need for manual assistance of a vehicle by an operator being remote from the vehicle, the vehicle being a vehicle with autonomous propulsion capability; an obtainer module configured to obtain a stream of vehicle data, the vehicle data relating to a time prior to when remote control starts; a data modifier module configured to modify the vehicle data, which comprises adjusting a duration of playback of the vehicle data; a data provider module configured to provide the modified vehicle data for playback to the operator, and to provide, once the playback of modified vehicle data has ended, vehicle data in real-time to the operator; and a remote control enabler module configured to enabling remote control of the vehicle by the operator.

According to a fourth aspect, it is provided a computer program for enabling remote control of a vehicle with autonomous propulsion capability. The computer program comprises computer program code which, when run on a vehicle data provider causes the vehicle data provider to: detect a need for manual assistance of the vehicle by an operator being remote from the vehicle; obtain a stream of vehicle data, the vehicle data relating to a time prior to when remote control starts; modify the vehicle data, which comprises adjusting a duration of playback of the vehicle data; provide the modified vehicle data for playback to the operator; provide, once the playback of modified vehicle data has ended, vehicle data in real-time to the operator; and enable remote control of the vehicle by the operator.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, modules, step, etc." are to be interpreted openly as referring to at least one instance of the element, apparatus, component, means, modules, step, etc., unless explicitly stated otherwise. The steps of any method disclosed herein do not have to be performed in the exact order disclosed, unless explicitly stated.

BRIEF DESCRIPTION OF THE DRAWINGS

The example embodiments of invention are now described, by way of example, with reference to the accompanying drawings, in which.

DETAILED DESCRIPTION

Embodiments of the invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
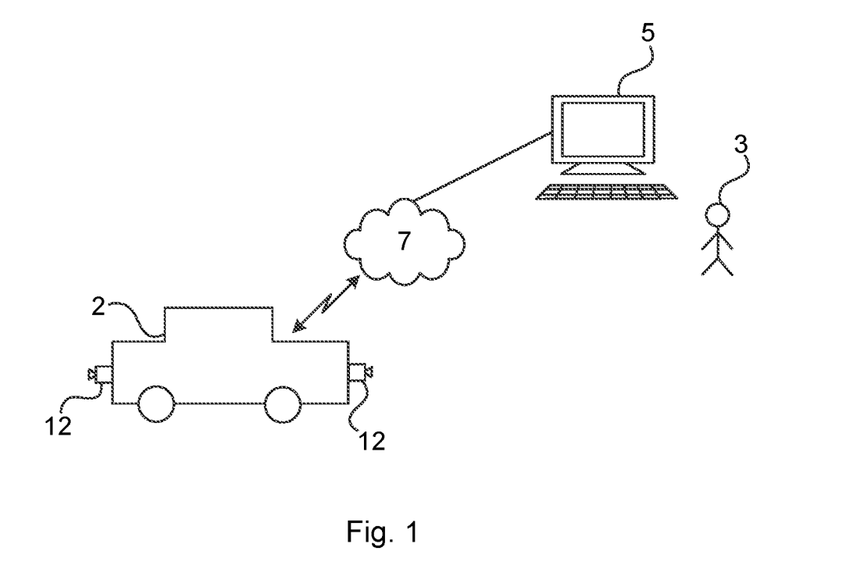
FIG. 1 is a schematic drawing illustrating an environment in which embodiments presented herein can be applied.

FIG. 1 is a schematic drawing illustrating an environment in which embodiments presented herein can be applied. A vehicle 2 is capable of autonomous propulsion for at least part of the time. For instance, the vehicle 2 can be a car with autonomous driving capability or an aerial vehicle (e.g. a drone) with autonomous flight capability. The vehicle comprises one or more cameras 12 which is used by an autonomous propulsion system (not shown). The vehicle 2 can also comprise additional sensor for acquiring relevant vehicle data such as audio, vehicle speed, vehicle motion, road conditions, aerial route conditions etc. The vehicle 2 can also acquire external vehicle data such as traffic conditions, road accidents/construction zones, weather conditions, etc. by communicating with neighbouring vehicles and/or a server. The vehicle 2 contains a control unit which defines how the vehicle should be operated in autonomous mode.

At times, the vehicle 2 needs to be remote controlled by an operator 3. The operator 3 is in a remote location from the vehicle 2. The operator 3 uses an operator device 5 for the remote control of the vehicle 2. The operator device 5 is in communication with the vehicle 2 via a network 7. The network can be a wide area network, such as the Internet, including a radio based interface to the vehicle 2, e.g. over a cellular communication network. Communication between the vehicle 2 and the operator device 5 can be encrypted.

The operator device 5 can be in the form of a computer. User input from the operator 3 can be obtained using e.g. a mouse, a keyboard, a steering wheel, pedals, joystick, etc. The display can be a traditional display and/or in the form of a virtual reality headset. Optionally, the operator device 5 comprises haptic elements for providing haptic vehicle data to the operator 3, e.g. in the form of force feedback on a steering wheel of the operator device. The operator device 5 can comprise additional input and output devices to improve remote control capability.

Figure 2A:
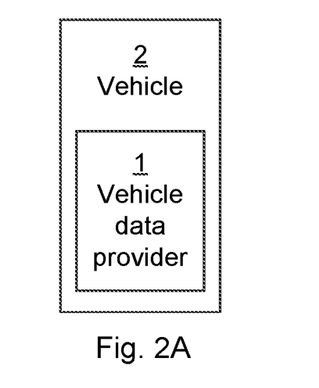
FIGS. 2A-B are schematic drawings illustrating embodiments of where a vehicle data provider can be implemented.
Figure 2B:
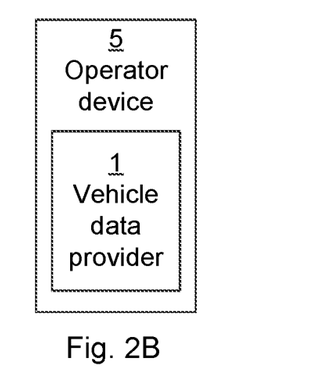

FIGS. 2A-B are schematic drawings illustrating embodiments of where a vehicle data provider 1 can be implemented. In FIG. 2A, the vehicle data provider 1 is provided as part of the vehicle 2. By implementing the vehicle data provider in the vehicle 2, the amount of transmitted vehicle data is reduced. Moreover, processing complexity at the operator device 5 is reduced. Also, this allows multiple operators to efficiently visualise the same transmitted vehicle data when this is desired.

In FIG. 2B, the vehicle data provider is provided as part of the operator device 5.

The purpose of the vehicle data provider is to obtain vehicle data and to modify the vehicle data in a way which efficiently prepares a remote operator for taking over the vehicle propulsion over remote control. In particular, the vehicle data provider adjusts the duration of playback in order to bring the operator to a suitable psychological and/or physical level when remote control starts within given time limits. Psychological level comprises knowledge of the situation and to be cognitively ready to take over control. Physical level comprises being in a suitable physical position and for the body be ready to perform necessary physical action.

Figure 3:
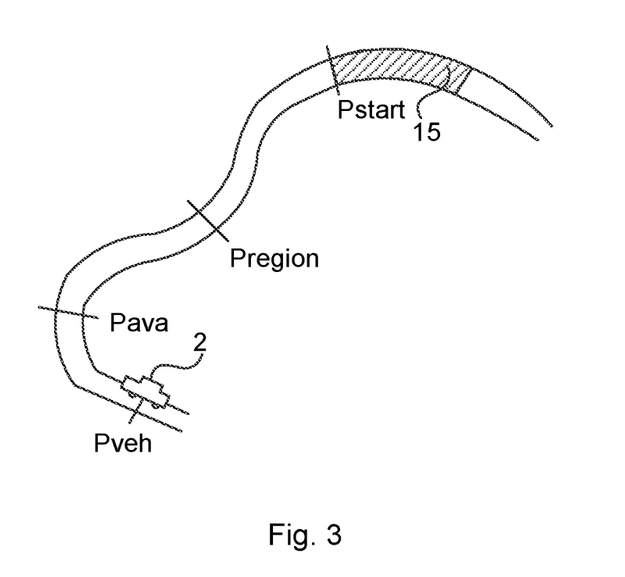
FIG. 3 is a schematic diagram illustrating vehicle progress in relation to remote control handover according to one embodiment.

FIG. 3 is a schematic diagram illustrating vehicle progress in relation to remote control handover according to one embodiment. In this example, the vehicle 2 is in a position Pveh. The vehicle 2 has detected a region 15 in which manual assistance is needed, using remote control of an operator by an operator device. The manual assistance will be needed to start at a takeover position Pstart, which is when the region 15 starts. The time of the takeover is denoted Tstart.

The time Tstart may be computed by the vehicle, given the current traffic conditions, vehicle characteristics and fuel consumption profile. In another embodiment, the time Tstart may be defined by a user/server which requires the vehicle to be at that location due to a scheduling constraint.

In one embodiment, the vehicle 2 may also predict a region around the takeover position Pstart where the most relevant vehicle data about the assistance can be obtained. As an example, the last 1 km before an accident area takes place, or where the weather conditions are severe, may contain relevant vehicle data that aids the operator to deal with the assistance issue in a quicker manner. The position of the start of the region is here denoted Pregion.

When manual assistance is determined to be needed, the vehicle establishes a connection to the remote operator via a communication link. However, the operator may not be immediately available. Hence, the vehicle may receive information regarding the expected time when the remote operator becomes available to assist the vehicle request, which we denote by Tava. The position of the vehicle at Tava is defined as Pava.

If several operators are available, the vehicle may receive the Tava from all available operators.

In one embodiment, the vehicle may receive information regarding the expected processing times from the selected operator, i.e., for a data of duration D, the operator may add a time DP to process the data.

Figure 4:
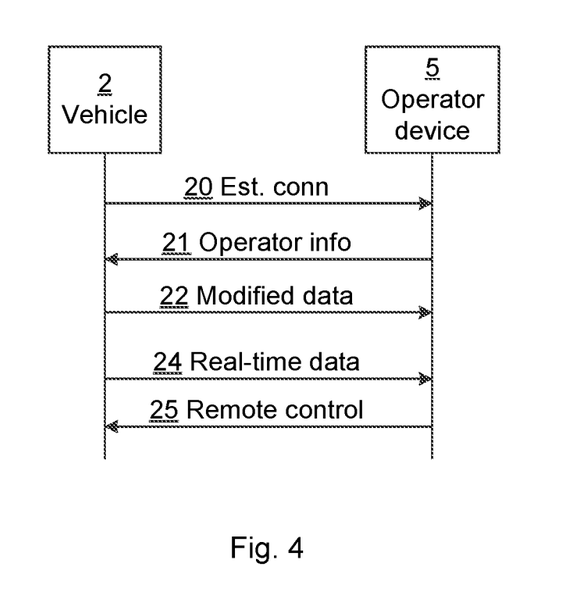
FIG. 4 is a sequence diagram illustrating communication between the vehicle and the operator device of FIG. 1.

FIG. 4 is a sequence diagram illustrating communication between the vehicle and the operator device of FIG. 1. This embodiment is based on the vehicle data provider being provided in the vehicle 2, as shown in FIG. 2A.

First, the vehicle 2 established 20 a connection with the operator device. The operator device 5 provides relevant operator information 21 to the vehicle, e.g. Tava. As explained in more detail below, the vehicle data is modified by the vehicle data provider and the modified vehicle data 22 is then sent to the operator device 5. Once remote control commences, real-time vehicle data 24 is provided to the operator device 5 and the operator device 5 assumes remote control 25 of the vehicle 2.

Figure 5A:
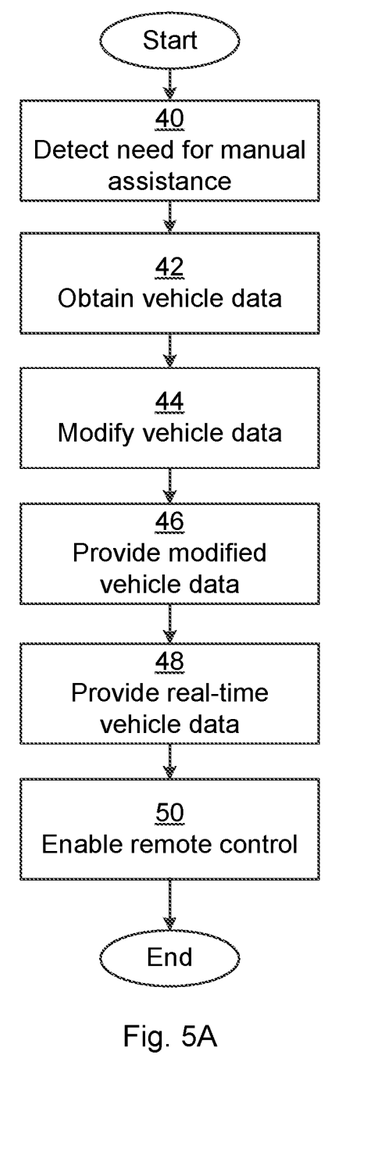
FIGS. 5A-B are flow charts illustrating methods for enabling remote control of a vehicle performed in the vehicle data provider of FIGS. 2A-B.
Figure 5B:
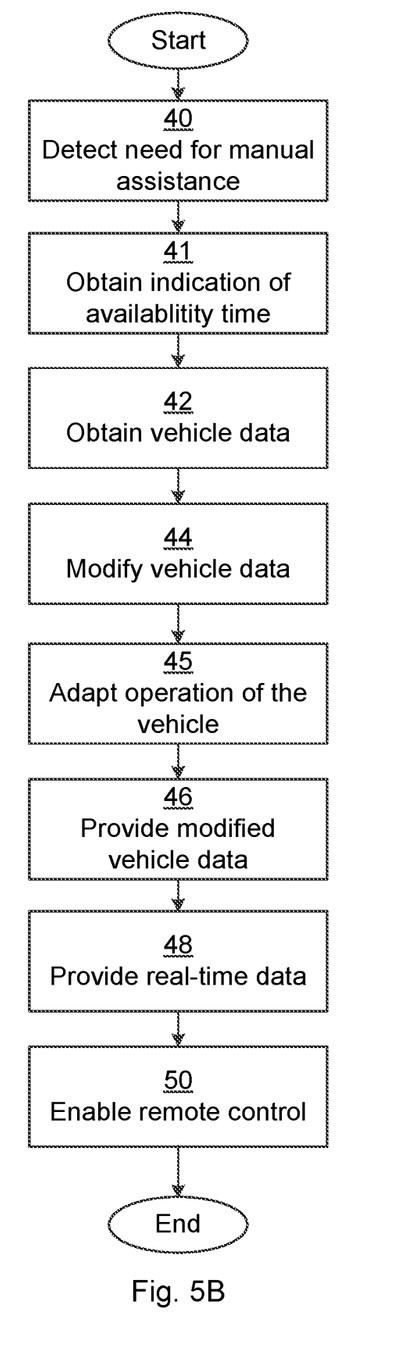

FIGS. 5A-B are flow charts illustrating methods for enabling remote control of a vehicle with autonomous propulsion capability, performed in the vehicle data provider of FIGS. 2A-B.

In a detect need for manual assistance step 40, the vehicle data provider detects a need for manual assistance of the vehicle by an operator being remote from the vehicle.

The detecting the need for manual assistance can be based on detecting a traffic exception in a navigation route of the vehicle, a notification that a map or environmental change has occurred in the vehicle path, or that the weather conditions at the future location will greatly affect the vehicle sensing and control capabilities. A takeover position (Pstart of FIG. 3) can then be derived based on a position of the traffic exception.

The vehicle requests manual assistance when the vehicle is not sure of what action to perform, given the available (internal and/or external) vehicle data. Based on the acquired vehicle data, the vehicle may become aware that a road construction or accident is taking place ahead which, with a high probability, will require a manual assistance for driving the vehicle through that situation.

In one embodiment, the detection is triggered by an event generated from a neighbouring vehicle or a server, while in one embodiment, the vehicle may be able to detect this information by analysing the received vehicle data. This detection can take place in any time period prior to the need of manual assistance, from seconds to several minutes.

In one embodiment, the vehicle may be able predict the takeover position where the manual assistance will be required. In one embodiment, the takeover position is transmitted from a neighbouring vehicle or server.

The need for assistance may vary based on vehicle type. Each vehicle can vary in the type of vehicle (car, truck, excavator, drone, etc.), and the level of autonomous propulsion capability of the vehicle.

In an obtain vehicle data step 42, a stream of vehicle data is obtained. Stream is here to be interpreted as each piece of vehicle data being associated with a capture time. The vehicle data relates to a time prior to when remote control starts, i.e. prior to Tstart. The vehicle data can comprise a video stream captured by a camera of the vehicle. The video stream improves the immersion capability of the operator prior to assuming remote control. Furthermore, the vehicle data can comprise any one or more of an audio stream, motion (haptic) data stream, vehicle speed, vehicle position, vehicle conditions, road conditions, weather conditions, traffic conditions, road accidents, and construction zones. As explained above, the various vehicle data can be obtained from sensors on-board the vehicle and/or with communication with other vehicles or servers.

In a modify vehicle data step 44, the vehicle data is modified. This comprises adjusting a duration of playback of the vehicle data. Playback is here the presentation of the vehicle data along a time line. For instance, the playback speed for at least part of the vehicle data can be increased, thereby reducing the time for presenting the vehicle data to the operator. Alternatively or additionally, this comprises setting a start time of the vehicle data based on the takeover position. The playback speed can be left at normal speed for a section which is considered of more importance for the operator, e.g. a zone with particular traffic conditions and/or road conditions.

Optionally or additionally, one way to reduce the duration of playback is to remove vehicle data of a certain time period which is considered of less importance for the operator.

The vehicle data can be adjusted based on a current time, a time at which the operator becomes available and the time of expected takeover, as explained above.

In one embodiment, all vehicle data is acquired and is adapted prior to transmission. For the operator to catch up with the current vehicle situation in a quick and effective manner, the vehicle data to be transmitted to the vehicle is then modified. As an example, the playback speed of the vehicle data is increased when the information contained in the vehicle data is not relevant, while its speed may be set to normal speed when the vehicle data is relevant to the operator (e.g. crossing an area with obstacles, bad road or weather conditions, high motion dynamics experienced by the vehicle, surrounding vehicles movements, etc.), Such adaptation will impact the time it will take for the operator to become aware of the vehicle situation and be ready to initiate the remote operation of the vehicle.

In one embodiment, only the relevant vehicle data to be used by the operator is acquired and transmitted to the operator.

Besides adapting the speed of the media to be consumed by the user, in one embodiment, the vehicle data size may be adapted based on the Tava to make the duration shorter if less time is available, and vice-versa. In the same way, if the operator has more time to consume the vehicle data, additional vehicle data may be transmitted such as additional camera views from the vehicle itself or neighbouring vehicles, diagnostics of the vehicle current condition, among other information that could be used by the operator to improve the vehicle remote control and/or understanding of the current vehicle situation.

Optionally, the modifying of the vehicle data is based on a state of the remote operator.

In a provide modified vehicle data step 46, the modified vehicle data is provided for playback to the operator. The vehicle data is to be transmitted from the vehicle to the remote operator to aid the operator in understanding the current vehicle situation but also to eventually perform real-time remote control of the vehicle. As mentioned above, various types of vehicle data can be transmitted such as audio, video, and vehicle status (speed, motion, etc.), vehicle and road or weather conditions, etc.)

In a provide real-time vehicle data step 48, once the playback of modified vehicle data has ended, vehicle data is provided in real-time to the operator.

In an enable remote control step 50, remote control of the vehicle by the operator is enabled.

Looking now to FIG. 5B, only new or modified steps, compared to FIG. 5A, will be described.

In an optional obtain indication of availability time step 41, an indication of an availability time when the operator is available is obtained, i.e. Tava.

In an optional adapt operation of the vehicle step 45, operation of the vehicle is adapted such that the vehicle is expected to arrive at the takeover position based on the time when the playing back of the modified vehicle data has ended. When this step is performed, the vehicle data provider forms part of the vehicle (as shown in FIG. 2A). Also, the detect need for manual assistance step 40 then comprises receiving an estimated takeover position (Pstart of FIG. 3) where the need for remote control the vehicle is expected.

In one embodiment, this step comprises adapting operation speed of the vehicle when this is possible and still expect the vehicle to arrive at the takeover position based on the time when the playing back of the modified vehicle data has ended.

Hence, the vehicle operation can be adapted based on the acquired vehicle data, Tava and Tstart, and is performed to optimise the vehicle operation. The adaptation may be performed with respect to the vehicle speed and route.

In one embodiment, the vehicle operation adaptation is performed to maximise fuel efficiency. The vehicle operation may also be adapted to minimise road disturbances by driving through a less congested route.

In one embodiment, the adaptation may be subject to a minimum required vehicle speed. In another embodiment the adaptation may be subject to scheduling constraints, which may be imposed by the user or server, e.g. the vehicle must be at Tstart at a specific time.

In one embodiment, the vehicle may stop in an available parking location in the current route to wait for the operator to become available while reducing the amount of fuel which is consumed.

In one embodiment, the vehicle adapts its speed and route to reach the location where the assistance will be required at Tava plus the time it takes for the operator to consume the adapted vehicle data that is transmitted from the vehicle plus the real-time vehicle data transmission, which matches Tstart. In this way, the vehicle will not be stopped at the assistance location waiting for the remote operator to take control of the vehicle. Hence, fuel efficiency is increased and less traffic disturbances occur.

In one embodiment, the vehicle adapts its speed and route to allow for the vehicle data consumption to start at time Tava while adapting the vehicle motion so that the vehicle is located at the critical region at time Tregion, where real-time vehicle data is to be transmitted. In this way, the operator can receive the vehicle data in real-time throughout all the critical region, enhancing the awareness of the situation for the remote operator. The vehicle control handover is performed at time Tstart when the vehicle is located at the assistance location.

In one embodiment, the vehicle motion is adapted so that the takeover position Pstart is located at a certain distance before the actual need for manual assistance. In this way, the operator can become used to the vehicle dynamics and characteristics, prior to performing the most critical assistance manoeuvres. In this case, the vehicle speed and route is adapted so that the vehicle reaches the desired location when the adapted vehicle data consumption is finished.

In one embodiment, the adapting operation of the vehicle is based on a state of the remote operator. The psychological and physical readiness level of the remote operator could be measured via sensors at the operator location which is used to determine the route and time to drive until PStart. Optionally, another input is if the operator has already operated a vehicle at the same location, or how many vehicles the operator has operated earlier the same day.

Hence, given the state of the remote operator, the vehicle can be controlled to drive slower or faster, through specific regions to get a perception of similar conditions but not as adverse (e.g. drive through a road with several cars, rain, etc.) so that the psychological and physical levels are above a certain threshold.

When the obtain indication of availability time step 41 is performed, the adaptation of this step also considers the indication of the availability time.

In one embodiment, the vehicle can select which operator to control the vehicle. Alternatively, a central server matches an operator to a vehicle.

Using the embodiments presented herein, the vehicle data to be transmitted from the vehicle to the operator is adapted. This can consider a variety of available data, such as operator availability, vehicle conditions, and/or weather conditions. In this way, the time it takes for the operator to be ready to initiate the remote control of the vehicle is reduced, which increases the efficiency and effectiveness of the remote operation.

By optionally adapting the vehicle motion according to the adapted vehicle data to be transmitted to the operator and the operator availability, the efficiency of the vehicle operation is improved, e.g. by reducing fuel consumption and reducing traffic disturbances, until the remote operator assumes remote control of the vehicle.

A scenario, in which embodiments presented herein can be applied, will now be described. In this scenario, an autonomous taxi is driving from location A to location B. The vehicle drives through a region where construction work is underway and many construction machines and construction vehicles are on the road and on the shoulder. Several pot-holes are present in the region. The vehicle receives data from the road server indicating that the conditions are about to become more severe. Hence, the probability of requesting assistance is high and a request for operator assistance is issued.

In this scenario, the time until the operator becomes available Tava is in 8 minutes from a current time. Also, the assistance location is computed and Tstart is estimated to 12 minutes from the current time. A critical region location Pregion is defined to be 500 meters before the assistance location, since the critical region is believed to contain relevant vehicle data for the operator. Tregion is calculated to be 10 minutes from the current time (based on an expected speed between Pregion and Pstart), estimating that it will take 1 minutes to drive through the critical region.

The vehicle is set to acquire and adapt the vehicle data from the current instant until the vehicle reaches Tregion, which is due to take 10 minutes. When the vehicle reaches Pregion, it is intended that all adapted vehicle data has been consumed and real-time vehicle data begins to be transmitted.

In this way, the 10 minutes of vehicle data is adapted to have a size of 1 minutes (the time difference between Tava and Tregion). Hence, when the operator becomes available (in 8 minutes), it takes 1 minute for the operator to consume the adapted vehicle data and after that the operator has caught up and begins the visualisation of real time vehicle data at Tregion, when the vehicle is expected to enter the critical region. According to embodiments herein, vehicle data (e.g. audio and video data) can be played at a high speed when the vehicle was passing through non-relevant places, for the operator to get an idea of the vehicle context, while the media can be played in real-time when the vehicle enters the critical region, where situations such as passing potholes, slow moving machinery vehicles, pedestrians crossing, etc. are likely to occur. The media is thus reduced from 10 minutes to only 1 minute in duration. In this way, the operator can become aware of the current situation of the vehicle without needing to consume the complete vehicle data in nominal speed.

The vehicle motion adaptation is performed for the vehicle to move from the current location Pcurrent to the location Pava in 8 minutes, from Pava to Pregion in 1 minute and from Pregion to Pstart in 1 minute. At Tstart in location Pstart, the operator takes over control of the vehicle.

It is evident that in this way, the operator is efficiently made aware of the situation of the vehicle in only two minutes representing eighteen minutes of vehicle data. Moreover, the critical region is provided without any speed adjustment, in order to prevent the operator from missing details in the critical region. Hence, great flexibility in control over the preparation of the operator is provided.

Figure 6:
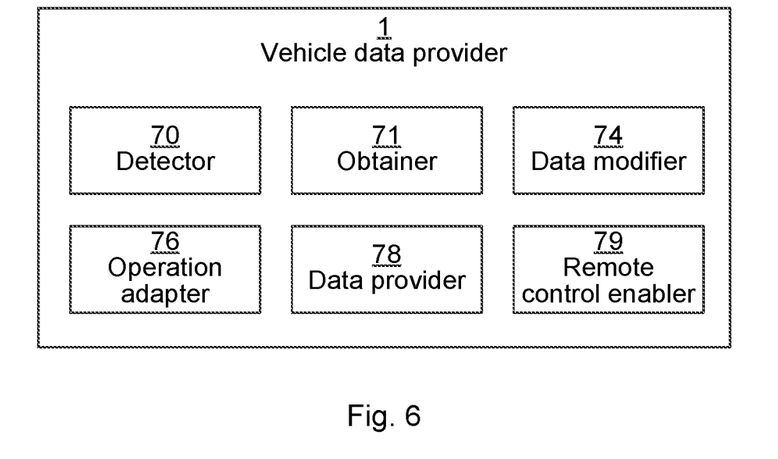
FIG. 6 is a schematic diagram showing functional modules of the vehicle data provider of FIGS. 2A-B according to one embodiment.

FIG. 6 is a schematic diagram showing functional modules of the vehicle data provider 1 of FIGS. 2A-B according to one embodiment. The modules are implemented using software instructions such as a computer program executing in the vehicle data provider 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A and 5B.

A detector 70 corresponds to step 40. An obtainer 71 corresponds to steps 41 and 42. A data modifier 74 corresponds to step 44. An operation adapter 76 corresponds to step 45. A data provider 78 corresponds to steps 46 and 48. A remote control enabler 79 corresponds to step 50.

Figure 7:
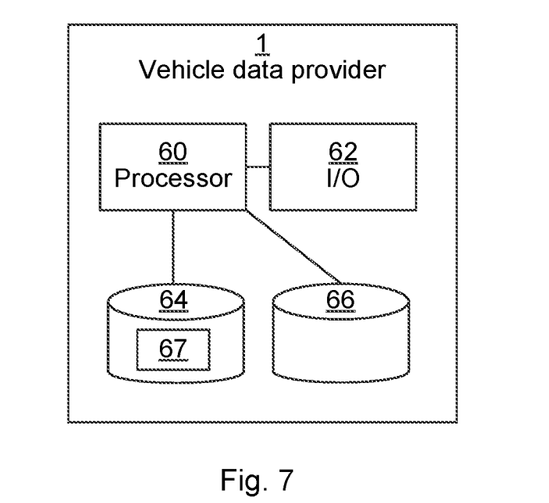
FIG. 7 is a schematic diagram illustrating components of any one of the vehicle data provider of FIGS. 2A-B according to one embodiment.

FIG. 7 is a schematic diagram illustrating components of the vehicle data provider 1 of FIGS. 2A-B. It is to be noted that one or more of these components can 3o optionally be shared with the host device, e.g. the vehicle 2 (as in FIG. 2A) or the operator device 5 (as in FIG. 2B). A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. 5A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The vehicle data provider 1 further comprises an I/O interface 62 for communicating with other external entities.

Other components of the vehicle data provider 1 are omitted in order not to obscure the concepts presented herein.

Figure 8:
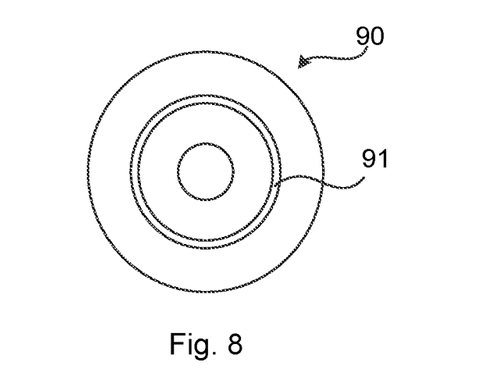
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The embodiments of the invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling remote control of a vehicle with autonomous propulsion capability, the method being performed by a vehicle data provider that forms a part of the vehicle, the method comprising:
    detecting a need for remote control of the vehicle by receiving an estimated takeover position (Pstart) where the need for remote control of the vehicle is expected;
    obtaining a stream of vehicle data, the vehicle data relating to a time prior to when remote control of the vehicle by the operator starts;
    modifying the vehicle data, which comprises adjusting a duration of playback of the vehicle data;
    adapting operation of the vehicle such that the vehicle is expected to arrive at the estimated takeover position (Pstart) based on a time when the playing back of the modified vehicle data has ended;
    providing the modified vehicle data for playback to the operator;
    providing, once the playback of modified vehicle data has ended, vehicle data in real-time to the operator; and
    enabling remote control of the vehicle by the operator.

2. The method according to claim 1, wherein the vehicle data comprises a video stream captured by a camera of the vehicle.

3. The method according to claim 1, wherein the adapting operation comprises adapting an operation speed of the vehicle when this is possible, wherein it is possible when it is still expected that the vehicle is to arrive at the takeover position based on the time when the playing back of the modified vehicle data has ended.

4. The method according to claim 1, wherein detecting the need for remote control of the vehicle is based on detecting a traffic exception in a navigation route of the vehicle, and wherein the takeover position is based on a position of the traffic exception, the traffic exception comprising at least one of road construction in the navigation route, an accident taking place ahead in the navigation route, and a traffic condition causing vehicles to slow down.

5. A vehicle data provider for enabling remote control of a vehicle with autonomous propulsion capability, the vehicle data provider forming part of the vehicle and comprising:
    a processor; and
    a memory storing instructions that, when executed by the processor, cause the vehicle data provider to:
        detecting a need for remote control of the vehicle by receiving an estimated takeover position (Pstart) where the need for remote control of the vehicle is expected;
        obtain a stream of vehicle data, the vehicle data relating to a time prior to when remote control of the vehicle by the operator starts;
        modify the vehicle data, which comprises adjusting a duration of playback of the vehicle data;
        provide the modified vehicle data for playback to the operator;
        adapt operation of the vehicle such that the vehicle is expected to arrive at the estimated takeover position (Pstart) based on a time when the playing back of the modified vehicle data has ended;
        provide, once the playback of modified vehicle data has ended, vehicle data in real-time to the operator; and
        enable remote control of the vehicle by the operator.

6. The vehicle data provider according to claim 5, wherein the vehicle data comprises a video stream captured by a camera of the vehicle.

7. The vehicle data provider according to claim 5, wherein the instructions to adapt operation comprise instructions that, when executed by the processor, cause the vehicle data provider to adapt an operation speed of the vehicle when this is possible, wherein it is possible when it is still expected that the vehicle is to arrive at the takeover position based on the time when the playing back of the modified vehicle data has ended.

8. The vehicle data provider according to claim 5, wherein the instructions to detect the need for remote control of the vehicle is based on detecting a traffic exception in a navigation route of the vehicle, and wherein the takeover position is based on a position of the traffic exception, the traffic exception comprising at least one of road construction in the navigation route, an accident taking place ahead in the navigation route, and a traffic condition causing vehicles to slow down.

9. The vehicle data provider according to claim 5, wherein the instructions to modify the vehicle data comprise instructions that, when executed by the processor, cause the vehicle data provider to set a start time of the vehicle data based on the takeover position.

10. The vehicle data provider according to claim 5, further comprising instructions that, when executed by the processor, cause the vehicle data provider to:
obtain an indication of an availability time when the operator is available based on receiving information regarding an expected time when the operator becomes available to assist the vehicle; and
wherein the instructions to adapt the operation of the vehicle comprise instructions that, when executed by the processor, cause the vehicle data provider to also consider the indication of the availability time.

11. The vehicle data provider according to claim 5, wherein the instructions to adapt operation of the vehicle comprise instructions that, when executed by the processor, cause the vehicle data provider to adapt the operation of the vehicle based on a state of the operator.

12. The vehicle data provider according to claim 5, wherein the vehicle data further comprises any one or more of an audio stream, haptic data stream, vehicle speed, vehicle position, vehicle conditions, road conditions, traffic conditions, road accidents, and construction zones.

13. The vehicle data provider according to claim 5, wherein the instructions to modify the vehicle data comprise instructions that, when executed by the processor, cause the vehicle data provider to increase a playback speed for at least part of the vehicle data.

14. The vehicle data provider according to claim 5, wherein the instructions to modify the vehicle data comprise instructions that, when executed by the processor, cause the vehicle data provider to modify the vehicle data based on a state of the operator.

15. A computer program product for enabling remote control of a vehicle with autonomous propulsion capability, the computer program product comprising a non-transitory computer readable medium storing computer program code which, when run on a processor of a vehicle data provider, which forms part of the vehicle, causes the vehicle data provider to:
detecting a need for remote control of the vehicle by receiving an estimated takeover position (Pstart) where the need for remote control of the vehicle is expected;
obtain a stream of vehicle data, the vehicle data relating to a time prior to when remote control of the vehicle by the operator starts;
modify the vehicle data, which comprises adjusting a duration of playback of the vehicle data;
provide the modified vehicle data for playback to the operator;
adapt operation of the vehicle such that the vehicle is expected to arrive at the estimated takeover position (Pstart) based on a time when the playing back of the modified vehicle data has ended;
provide, once the playback of modified vehicle data has ended, vehicle data in real-time to the operator; and
enable remote control of the vehicle by the operator.

\* \* \* \* \*